United States Patent
Maya et al.

(10) Patent No.: US 9,333,872 B2
(45) Date of Patent: May 10, 2016

(54) CHARGING NOTIFICATION AND INQUIRY OF AN ELECTRIC VEHICLE

(71) Applicant: Continental Automotive Systems, Inc., Auburn Hills, MI (US)

(72) Inventors: Alejandro Maya, Plainfield, IL (US); Briere J Douge, Chicago, IL (US)

(73) Assignee: Continental Automotive Systems, INC., Auburn Hills, MI (US)

( * ) Notice: Subject to any disclaimer, the term of this patent is extended or adjusted under 35 U.S.C. 154(b) by 0 days.

(21) Appl. No.: 14/333,595

(22) Filed: Jul. 17, 2014

(65) Prior Publication Data

US 2016/0016481 A1 Jan. 21, 2016

(51) Int. Cl.
*B60Q 1/00* (2006.01)
*B60L 11/18* (2006.01)
*B60W 50/14* (2012.01)

(52) U.S. Cl.
CPC ............ *B60L 11/1861* (2013.01); *B60W 50/14* (2013.01); *B60W 2050/143* (2013.01)

(58) Field of Classification Search
CPC ................................. B60R 1/00; B60R 16/033
USPC .............. 340/455, 439, 632.2, 636.1; 701/22, 701/29.1, 33; 320/104, 109
See application file for complete search history.

(56) References Cited

U.S. PATENT DOCUMENTS

| | | | | |
|---|---|---|---|---|
| 2010/0094496 A1* | 4/2010 | Hershkovitz | .............. | B60L 3/12 701/22 |
| 2010/0268411 A1* | 10/2010 | Taguchi | .............. | B60L 11/1809 701/31.4 |
| 2011/0225105 A1* | 9/2011 | Scholer | .................. | G06Q 50/06 705/412 |
| 2012/0065831 A1 | 3/2012 | Ross et al. | | |
| 2012/0179311 A1* | 7/2012 | Skaff | .................. | B60L 11/1861 701/22 |
| 2012/0209465 A1* | 8/2012 | Dehmann | ........... | B60R 16/0236 701/22 |
| 2013/0271076 A1 | 10/2013 | Gregg et al. | | |
| 2014/0371970 A1 | 12/2014 | Lovett et al. | | |

OTHER PUBLICATIONS

Search Report dated Feb. 9, 2015, from corresponding GB Patent Application No. GB1415019.7.

* cited by examiner

*Primary Examiner* — Tai T Nguyen

(57) ABSTRACT

A text message, phone call or e-mail is sent to an owner/operator of an all-electric vehicle, stating when the vehicle should be plugged in (charging started) in order to provide enough charge to the vehicle in order to reach an expected destination.

16 Claims, 4 Drawing Sheets

| Vehicle Average Charge Time | | |
|---|---|---|
| | 120 Volt Charger | 240 Volt Charger |
| Monday | 8 miles / hour | 40 miles / hour |
| Tuesday | 8 miles / hour | 40 miles / hour |
| Wednesday | 8 miles / hour | 40 miles / hour |
| Thursday | 8 miles / hour | 40 miles / hour |
| Friday | 8 miles / hour | 40 miles / hour |
| Saturday | 8 miles / hour | 40 miles / hour |
| Sunday | 8 miles / hour | 40 miles / hour |

FIG. 4

CHARGING NOTIFICATION AND INQUIRY OF AN ELECTRIC VEHICLE

BACKGROUND

An all-electric vehicle is a car or truck propelled by an electric motor using only the electrical energy stored in rechargeable batteries. People who drive all-electric vehicles are often concerned the batteries powering an all-electric vehicle will run out of energy before reaching their destination. Such concern is known as "range anxiety."

Range anxiety can be reduced and even eliminated by charging the batteries of an all-electric vehicle to a level that will assure the driver that the batteries will not go dead before the vehicle makes it back home or to a charging station. Unfortunately, drivers of all-electric vehicles sometimes forget to plug in their vehicles, making a safe passage worrisome. A method and apparatus for reminding or notifying the owner of an all-electric vehicle to charge the vehicle would be an improvement over the prior art.

BRIEF SUMMARY

In accordance with embodiments of the invention, a text message, phone call or e-mail is sent to an owner/operator of an all-electric vehicle, stating when the vehicle should be plugged in (charging started) in order to provide enough charge to the vehicle in order to reach an expected destination.

BRIEF DESCRIPTION OF THE DRAWINGS

FIG. 4 is a chart, displayed on a user's cell phone and obtained from the system shown in FIG. 1, showing distances that can be traveled by an all-electric vehicle per unit of time that the vehicle's battery is charged.

DETAILED DESCRIPTION

Figure 1:
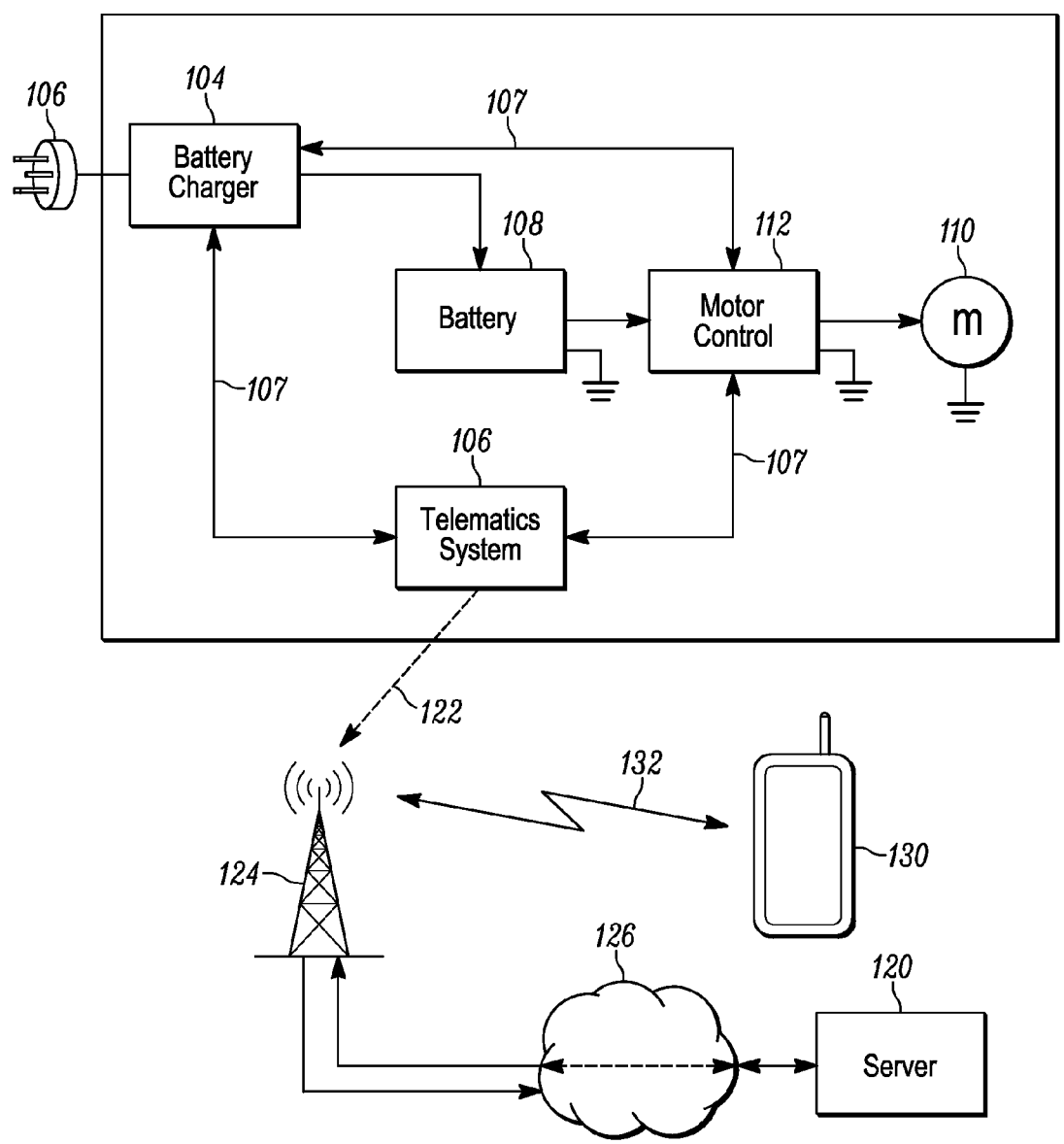
FIG. 1 depicts a charging system for notifying the owner or operator of an all-electric vehicle, to charge the vehicle's battery in order to be able to reach a destination.

FIG. 1 depicts a battery charging notification system 100. The system will determine a time of day when the charging of a battery of an all-electric vehicle should be begin. It will also determine a time of day when to notify an owner, operator, or other party to start charging the battery in order to be able to reach a destination to which the vehicle is typically driven each day. The system determines a time of day required to start charging the vehicle battery using a history of vehicle usage data, destination data, charging data, and battery data. The system's notification of when to start charging a vehicle battery is provided by a text message, e-mail, or both.

The battery charging notification system 100 comprises a battery charger 104 configured to receive power at either 110-volts A.C. or 220-volts A.C. The A.C. charging power is provided to the battery charger 104 via a conventional plug 106. The battery charger 104 converts the A.C. voltage to a D.C. voltage that is appropriate to charge a storage battery 108. The battery 108, which is actually an array of re-chargeable batteries connected in parallel and/or series to each other, is coupled to a drive motor 110 for the vehicle (not shown) through a motor controller 112.

As used herein, a "bus" is a set of parallel conductors in a computer system that forms a main transmission path. A controller area network or "CAN" bus is an industry-standard vehicle bus designed to allow microcontrollers and other devices to communicate with each other within a vehicle. Further discussion of the CAN bus is omitted for brevity.

The term, "telematics system" refers to a system in a motor vehicle by which vehicle-located devices and systems can send and receive information to and from a remote location or entity via a wireless link. A telematics system thus comprises a network access device or NAD, which is able to communicate through a wireless network such as a cell phone network. In FIG. 1, a telematics system 106 sends and receives data via a wireless data link identified by reference numeral 122, is typically provided by a cellular network, represented in FIG. 1 by a graphic depiction of a cell site tower 124.

The battery charger 104 of the battery charging notification system 100 is connected to the motor controller 112 through a prior art controller area network (CAN) bus 107. The battery charger 104 is also connected to the telematics system 106 through the CAN bus 107.

Figure 2:
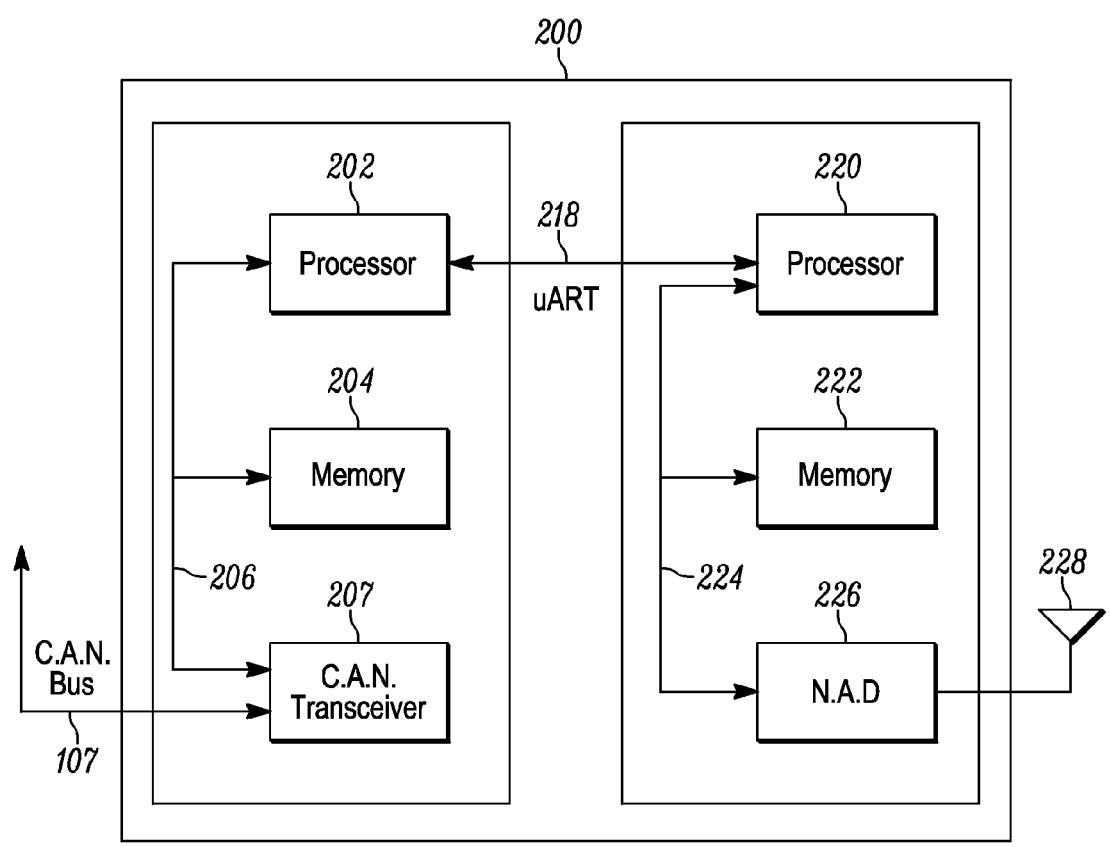
FIG. 2 is a block diagram of a telematics system.

FIG. 2 is a block diagram of a telematics system 200. The telematics system 200 comprises a first computer or processor 202 operatively coupled to a non-transitory memory device 204. The memory device 204 is preferably embodied as semiconductor RAM, ROM, EEPROM, etc., well-known in the computer art and coupled to the processor 202 via a conventional address/data/control bus 206.

The memory device 204 stores data and executable instructions for the first processor 202. When the stored instructions are executed by the first processor 202, they cause the first processor to perform operations that include sending and receiving information, i.e., data, to and from a CAN bus transceiver 207.

The CAN bus transceiver 207 provides an interface between the first processor 202 and the CAN bus 107. The transceiver 207 thus interfaces or couples the first processor 202 to the battery charger 104 and motor controller via the can bus 107.

In a preferred embodiment, the telematics system 200 includes a second processor 220 operatively coupled to its own non-transitory memory device 222. As with the first processor 202 and the first memory device 204, the second memory device 222 is typically embodied as one or more RAM, ROM, EEPROM devices, which store program instructions for the second processor 220. The second memory device is coupled to the second processor 220 via a second, conventional address/data/control bus 224.

The second processor 220, its associated memory 222, and corresponding instructions control a network access device (NAD) 226. The NAD 226 is a radio frequency transceiver 226, preferably configured to provide two-way data communications through a cellular telephone network.

The NAD 226 is coupled to the second processor 220 via the second bus 224. The NAD 226 sends and receives radio frequency signals through an antenna 228 coupled to the NAD 226 conventionally.

The NAD 226 transmits to a compatible RF receiver, not shown, data that the NAD 226 receives from the second processor 220. The NAD 226 is also able to receive signals from the antenna 228, demodulate those signals to recover data therein, and send the recovered data to the processor 220 via the conventional bus 224.

As described more fully below, determining a time of day when battery charging should begin is made by considering the charging voltage, i.e., the voltage provided to the charger 104, the average time of time day that a driver first leaves after charging the battery 108, e.g., the time of day that a driver typically leaves home for work, the average or typical distance driven after charging the battery, and the state of charge in the battery. The determination of the time of day when charging should begin and the determination of the time of day when an alert message should be sent can be made by either the first processor 202 or the second processor 220 by executing program instructions stored in a corresponding memory device 204, 222. The necessary calculations can also be "shared" such that some calculations are performed by the first processor 202 and other calculations are performed by the second processor 220. In a preferred embodiment, the second processor 220 (for the network access device 226) performs all of the calculations required to determine when charging should begin and when the alert message should be sent.

Still referring to FIG. 2, the second processor 220 is coupled to the first processor 202 via a serial communications bus 218. The communications bus 218 is provided by a universal asynchronous receiver/transmitter, commonly known as a UART located within or fabricated as part of each processor 202, 220. The serial communications bus 218 enables the transfer of information between the two processors 202 and 220. The second processor 220 is thus able to receive information from the first processor 202. Such information includes, but is not limited to, information about the battery's state of charge, charger voltage, a history of vehicle usage. The second processor 220 causes information to be transmitted from the NAD 226 to a wireless service provider. The wireless service provider routes the data to an Internet service provider, which routes the data to a server 120 or a user's cell phone 130. In an alternate embodiment, the server 120 can be configured to receive information from the battery charging notification system 100 and calculate a time of day when charging must begin in order for the vehicle to be able to reach an expected destination, i.e., a destination to which the vehicle is usually driven, the following day. The server 120 can also calculate a time when an alert message should be sent.

Referring again to FIG. 1, the telematics system 106 essentially couples the battery charging notification system 100 to a server 120 located at a remote location. Such communications are effectuated by a wireless data link 122 set up between the NAD of the telematics system 106 (See FIG. 2) and a wireless communications network 124, e.g., a cell phone network. Since a cell phone network 124 provides connections to Internet service providers, the battery charging notification system 100 is able to wirelessly communicate with a server 120 at a remote location so long as the server 120 is accessible through a network 126 such as the Internet.

A conventional cellular telephone 130 can communicate with the server 120 and/or the telematics system 106 through the same wireless network 124 using a conventional, cellular network connection 132 established between the cell phone 130 and the network 124. Since the network 124 provides data connections to and from the telematics system 106 and the server 120, the cell phone 130 is able to receive and send data, from and to respectively, the server 120 and the telematics system 106. The cell phone 130 is thus able to send and receive information to and from the vehicle regarding the state of charge of the battery 108. The cell phone 130 is also able to receive alerts or messages providing the state of charge and/or a message stating when charging should be initiated. The cell phone 130 is also able to send requests for information to the telematics system 106. Such requests can include an update or report on historical usage of the vehicle, state of charge and a report on a time of day that charging should begin. Updates, reports, and charging notifications are conveyed as text messages, e-mail, or both. In a preferred embodiment, the cell phone 130 preferably communicates with the telematics system 106 indirectly, i.e., through the server 120.

Figure 3:
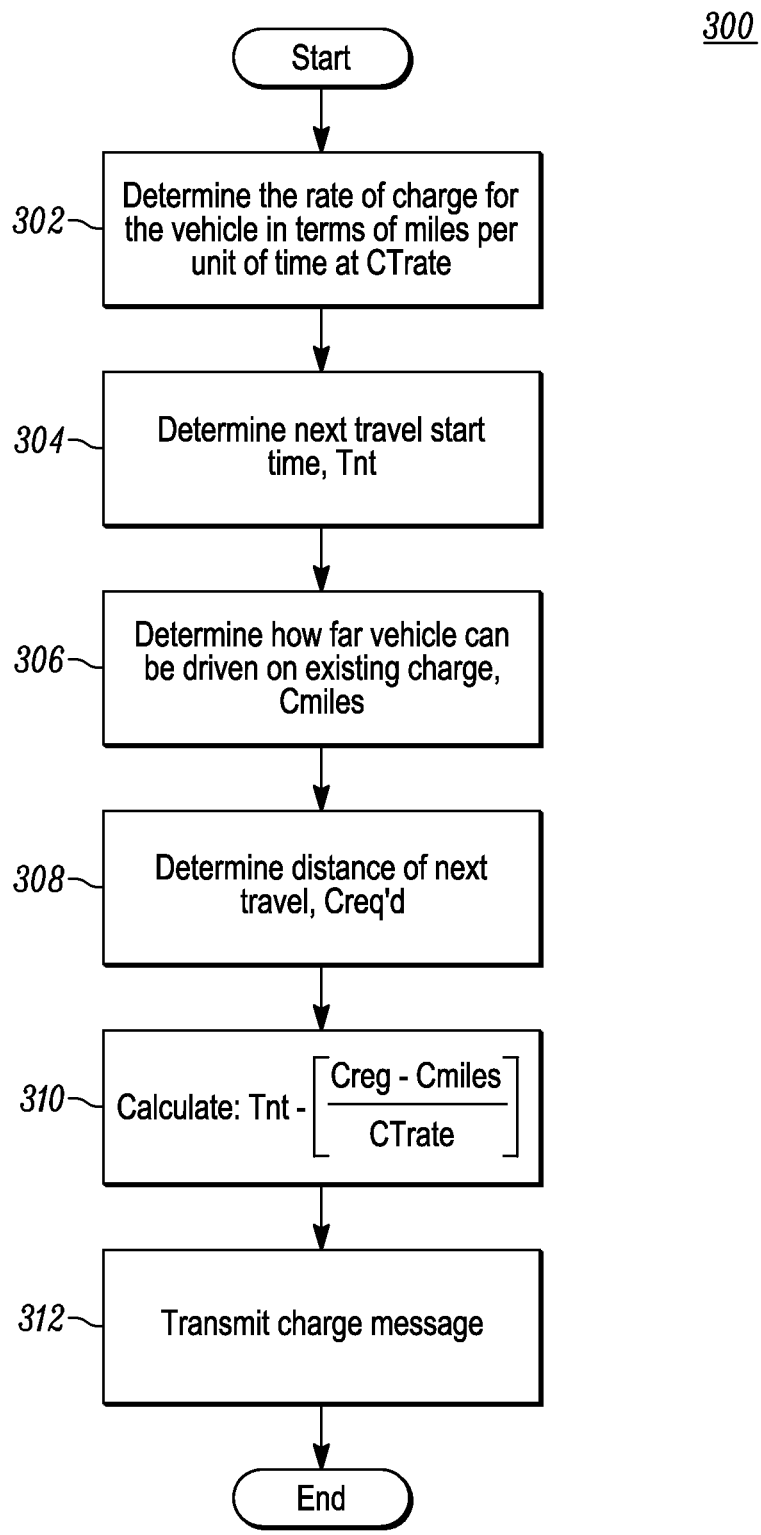
FIG. 3 depicts steps of a method to notify the owner or operator of an all-electric vehicle, to charge the vehicle's battery in order to be able to reach a destination.

Referring now to FIG. 3, a method 300 of providing notification to a user of a time when the battery of an all electric vehicle should be charged is provided. The method 300 is preferably performed by a processor in a vehicle. But it can also be performed by a server/processor located away from the vehicle but coupled to the vehicle through a wireless network.

At a first step 302, program instructions for one of the telematics system's first and second processors determine a number of miles the vehicle can be driven per unit of time that the battery is charged. In a preferred embodiment, step 302 includes determining the charging distance per unit of charging time for a particular charging voltage. Step 302 thus includes determining a charge time for a number of miles the vehicle can be driven using a particular voltage, i.e., 120 volts or 240 volts that will be used to charge the vehicle's battery.

Those of ordinary skill in the art will recognize that a 240-volt charging voltage will re-charge the battery 108 faster than a 120-volt charging voltage. A 240-volt charging voltage will therefore increase the distance that the all-electric vehicle can travel per unit of charge time, over and above the distance that the vehicle can travel if the charging voltage is 120 volts.

Information on the state of charge and the time required to charge a vehicle in order to travel a particular distance is important to users of all-electric vehicles. Such information is collected by the telematics system and made available to a vehicle operator through the wireless communications provided by the network access device (NAD) of the telematics system.

FIG. 4 is a chart of average distances that an electric vehicle can travel per hour of charge time using two different charging voltages, i.e., 120 volts and 240 volts, and which is sent to and displayed on a cell phone, responsive to an information request transmitted from the cell phone to the telematics system. As FIG. 4 shows, the distance that an all-electric vehicle can travel per hour of charge time at 240 volts is five times (5×) the distance that the same vehicle can travel per hour of charge time at 120 volts. The operator of the vehicle is thus notified how much time will be required to charge the vehicle battery in order to be able to travel a particular distance.

Referring again to FIG. 3, at step 304, program instructions in the memory device for one of the first and second processors of the telematics system 106 determine the average time of day, measured in Greenwich Mean Time (GMT), when the vehicle is first driven. Stated another way, at step 304, the telematics system determines an average or typical GMT time of day when the vehicle is typically driven for the first time. The average time of day when the vehicle is first driven requires a determination that the vehicle has been idle for an extended period of time, typically overnight, and at least five hours and preferably eight hours.

At step 306, program instructions for one of the processors determine how far the vehicle can be driven on the existing battery charge, i.e., the current state of charge (SOC) of the vehicle battery 108. The distance that the vehicle can travel on the existing charge is determined empirically, which is to say, by observations conducted by the telematics system 106 over a period of at least five (5) days of operation.

At step 308, program instructions for one of the processors determine the typical or average distance of the next travel to be taken by the vehicle, e.g., the distance the vehicle's driver typically drives to and from work each day. The next-day's travel distance is determined empirically by calculating or measuring the distance that the car first travels each day to its first destination.

At step 310 a calculation is performed to determine a time when the operator or owner of the vehicle will need to be notified in order to charge the vehicle to a sufficient level to get to, and return from the destination typically driven to each day. In other words, at step 310, the telematics system determines a time of day in GMT, when the charger 104 needs to be "plugged in" so that the battery 108 will be charged to a level that will allow the driver to get to work and back the next day.

Calculating when the charger needs to be plugged in so that a user can be assured of sufficient charge and overcome "range anxiety" requires the distance of the next travel, determined at step 308, to be reduced by the existing mileage that the vehicle can be driven on the existing charge, as determined at step 306. The difference between those two distances is then divided by the charge rate quantity determined at step 302, which is the number of miles the vehicle can be driven per unit of battery charge.

In a preferred embodiment, the calculation at step 310 increases the amount of time the battery should be charged in order to provide the battery 108 with a charge that is slightly larger or greater than that required to traverse the typically days' commute. This excess charge level is a design choice, preferably selected to extend battery life.

When the difference between the distance determined at step 308 and the distance determined at step 306 is divided by the charging rate/time determination of step 302 yields a time in GMT and is the unit of time, e.g., days, hours or minutes, the charger 104 needs to be plugged in to a charging voltage in order to sufficiently charge the battery to a level that will enable the vehicle to travel the expected distance.

The precise time of day that the charger needs to be plugged in is determined at step 304, where the next-day's departure time is reduced by the required charge time, i.e., the time required to charge the vehicle to a level that will enable the vehicle to reach and return from an expected destination.

At step 312 a message is transmitted from the telematics system preferably to a server 120. In a preferred embodiment the server 120 formats a message which is transmitted to the cell phone 130 via the networks 126 and 124. If the vehicle is timely connected to the appropriate charging voltage, when the vehicle is driven the next day, the driver can know that sufficient charge was added to the battery such that the vehicle can be driven to its usual destination and return without depleting the battery. Range anxiety can thus be eliminated or at least reduced.

In an alternate embodiment, the quantities determined at steps 302-308 are transmitted to the server via the wireless network 124 and the required plug-in time of day determined at step 310 is performed at the server 120. In such an alternate embodiment, the server 120 autonomously formats and transmits a message to the cell phone 130 warning or advising the operator of the time when the vehicle will need to be plugged in to be able to make the next day's first trip.

Those of ordinary skill in the art will recognize that the charge times and distances determined in steps 302-308 are dependent on the voltage provided to the charger. In a preferred embodiment, the determinations of steps 302-308 are made using the previous-days' charging voltage. A charging notification message can be either a text message sent to a cell phone, a pre-recorded voice message transmitted by a phone call or voice mailbox, or an e-mail message sent to a predetermined destination e-mail address.

The foregoing is for purposes of illustration only. The true scope of the invention is set forth in the following claims.

The invention claimed is:

1. A method of providing notification of when to charge an electric vehicle battery, the method comprising:
   determining a charge time for a number of miles the electric vehicle travels per unit of battery charging time;
   determining a next travel start time;
   determining an existing charge level travel distance;
   determining a next travel distance; and
   transmitting an alert to start charging the electric vehicle at a first calculated time of day, the alert being transmitted at a second calculated time of day, which is determined by a difference between the next travel start time and, a quotient of the next travel distance minus the existing charge level distance, and the charge time for a number of miles the electric vehicle travels per unit of battery charging time.

2. The method of claim 1, wherein determining a charge time for a number of miles the electric vehicle travels per unit of battery charging time additionally comprises determining a voltage that was last used to charge the electric vehicle.

3. The method of claim 1, wherein determining a charge time for a number of miles the electric vehicle travels per unit of battery charging time additionally comprises determining a voltage with which the electric vehicle is charged.

4. The method of claim 1, wherein determining a next travel start time comprises determining an average time of day, when the electric vehicle is first used after being recharged.

5. The method of claim 1, wherein determining an existing charge level travel distance comprises determining a distance the electric vehicle travels on an existing charge level by averaging a plurality of distances the electric vehicle was previously driven on a substantially same existing charge level.

6. The method of claim 1, wherein determining a next travel distance comprises determining an average distance the electric vehicle is when the electric vehicle is first used each day.

7. The method of claim 1, wherein transmitting an alert comprises sending a text message to a cellular telephone.

8. The method of claim 1, wherein calculating a time of day when charging the electric vehicle battery should begin is performed by a processor located in the electric vehicle.

9. The method of claim 1, wherein calculating a time of day when charging the electric vehicle battery should begin is performed by a processor coupled to the electric vehicle by a wireless network.

10. The method of claim 1, further comprising:
    transmitting to a server, the charge time for a number of miles the electric vehicle travels per unit of battery charging time;
    transmitting to the sever, a next travel start time;
    transmitting to a server an existing charge level travel distance;
    transmitting to a server, a next travel distance; and
    receiving from the server, a time of day that indicates when to start charging the electric vehicle battery.

11. The method of claim 1, further comprising:
    determining a time of day when the electric vehicle charging is started over a plurality of days;
    determining a distance that the electric vehicle travels on an existing charge over a plurality of days; and
    determining a voltage used to charge the electric vehicle.

12. A charging system for providing notification of when to charge a battery for an electric vehicle, the charging system comprising:
- a battery charger coupled to a motor controller and a battery, the battery charger configured to be coupled to a power source and to charge an electric vehicle battery;
- a telematics controller coupled to the battery charger and motor controller, the telematics controller being configured to track electric vehicle usage, battery state and transmit a state of charge message to a remotely-located server, the telematics controller being additionally configured to:
- determine a next travel start time when the electric vehicle will next be driven;
- determine an existing charge level travel distance;
- determine a next travel distance;
- transmit an alert message to a server, the alert message notifying an electric vehicle operator to start charging the vehicle at a first calculated time of day, the alert being transmitted at a second calculated time of day determined by a difference between the next travel start time and, a quotient of the next travel distance minus the existing charge level distance, and the charge time for a number of miles the vehicle travels per unit of battery charging time.

13. The system of claim 12, wherein the telematics controller is configured to calculate the first time of day and the second time of day.

14. The system of claim 12, further comprising a wireless transceiver coupled to the telematics controller, the wireless transceiver configured to transmit information to a server.

15. The system of claim 14, wherein the server is configured to calculate the first time of day and the second time of day.

16. The system of claim 12, further comprising a wireless transceiver coupled to the telematics controller, the wireless transceiver configured to provide a wireless data link between the telematics controller and a wireless communications device for a driver of the vehicle.

* * * * *